US012623791B2

(12) United States Patent
Rosenkrantz

(10) Patent No.: US 12,623,791 B2
(45) Date of Patent: May 12, 2026

(54) EJECTING ENERGY MODULE FROM AN AIRCRAFT

(71) Applicant: Raytheon Technologies Corporation, Farmington, CT (US)

(72) Inventor: Adam Rosenkrantz, Rocky Hill, CT (US)

(73) Assignee: RTX Corporation, Farmington, CT (US)

( * ) Notice: Subject to any disclaimer, the term of this patent is extended or adjusted under 35 U.S.C. 154(b) by 62 days.

(21) Appl. No.: 18/143,359

(22) Filed: May 4, 2023

(65) Prior Publication Data

US 2024/0367811 A1     Nov. 7, 2024

(51) Int. Cl.
*B64D 37/12* (2006.01)
*B64D 27/355* (2024.01)
*B64D 27/357* (2024.01)

(52) U.S. Cl.
CPC ............ *B64D 37/12* (2013.01); *B64D 27/355* (2024.01); *B64D 27/357* (2024.01)

(58) Field of Classification Search
CPC ..... B64D 37/12; B64D 27/355; B64D 27/357
See application file for complete search history.

(56) References Cited

U.S. PATENT DOCUMENTS

| | | | | | |
|---|---|---|---|---|---|
| 2,365,080 | A | * | 12/1944 | Humphreys | ........... B64D 37/12 |
| | | | | | 220/4.15 |
| 2,591,913 | A | * | 4/1952 | Bowers | ................. B64D 37/12 |
| | | | | | 244/135 R |
| 2,699,908 | A | * | 1/1955 | Fletcher | ................. B64D 37/12 |
| | | | | | 294/82.26 |
| 3,057,653 | A | * | 10/1962 | Lardin | ..................... B64D 1/06 |
| | | | | | 294/82.26 |
| 4,306,693 | A | | 12/1981 | Cooper | |
| 4,426,050 | A | | 1/1984 | Long | |
| 4,651,952 | A | | 3/1987 | Tavano | |
| 8,722,272 | B2 | | 5/2014 | Westenberger | |
| 10,866,594 | B2 | * | 12/2020 | Tillotson | ................. B64D 5/00 |

(Continued)

FOREIGN PATENT DOCUMENTS

| | | | | | |
|---|---|---|---|---|---|
| AU | 2021229217 | B1 | * | 12/2021 | ................ H02J 3/46 |
| CA | 2128993 | A1 | * | 1/1996 | ............. B64D 37/12 |

(Continued)

OTHER PUBLICATIONS

EP Search Report for EP Patent Application No. 24173949.9 dated Aug. 1, 2024.

*Primary Examiner* — Magdalena Topolski
(74) *Attorney, Agent, or Firm* — Getz Balich LLC

(57) ABSTRACT

An aircraft system that includes an aircraft airframe, a drive unit, a mechanical load, an energy module and an ejection system. The aircraft airframe has an internal compartment. The drive unit is mounted with the aircraft airframe. The mechanical load includes a mechanical load rotor. The drive unit is coupled to and configured to drive rotation of the mechanical load rotor. The energy module is disposed within the internal compartment. The energy module includes an energy source configured to power or fuel operation of the drive unit. The ejection system is configured to eject the energy module out of the internal compartment and away from the aircraft airframe

18 Claims, 11 Drawing Sheets

(56)        References Cited

U.S. PATENT DOCUMENTS

| | | | | |
|---|---|---|---|---|
| 11,682,917 B1 * | 6/2023 | Piasecki | ............... | H02J 7/0013 |
| | | | | 307/9.1 |
| 2013/0001364 A1 * | 1/2013 | Cardell | ................. | B64D 37/04 |
| | | | | 244/135 R |
| 2019/0352015 A1 | 11/2019 | Hall | | |

FOREIGN PATENT DOCUMENTS

| | | | | | |
|---|---|---|---|---|---|
| CN | 1628053 | A | * | 6/2005 | .............. B64D 1/04 |
| DE | 202004017942 | U1 | * | 4/2005 | .............. B64C 3/34 |
| FR | 500076 | A | | 3/1920 | |
| GB | 127842 | A | | 6/1919 | |
| RU | 2243925 | C2 | | 1/2005 | |
| WO | 2010086677 | A1 | | 8/2010 | |
| WO | 2021212070 | A1 | | 10/2021 | |

* cited by examiner

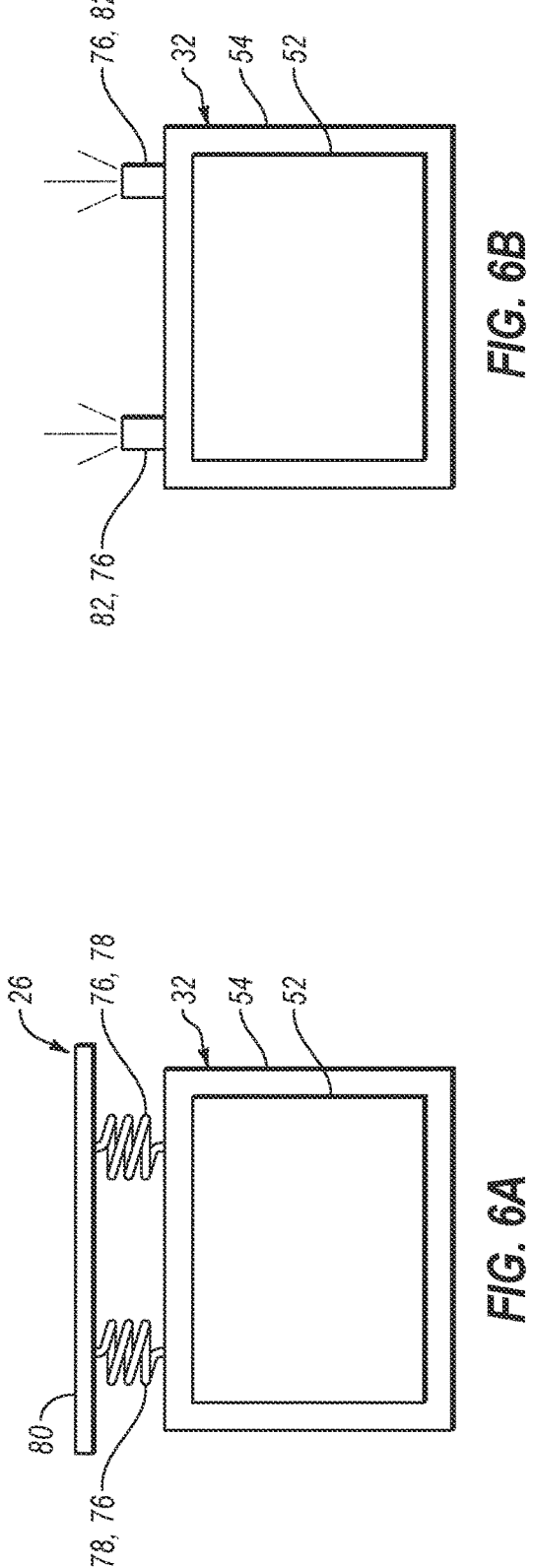
*FIG. 6A*
*FIG. 6B*
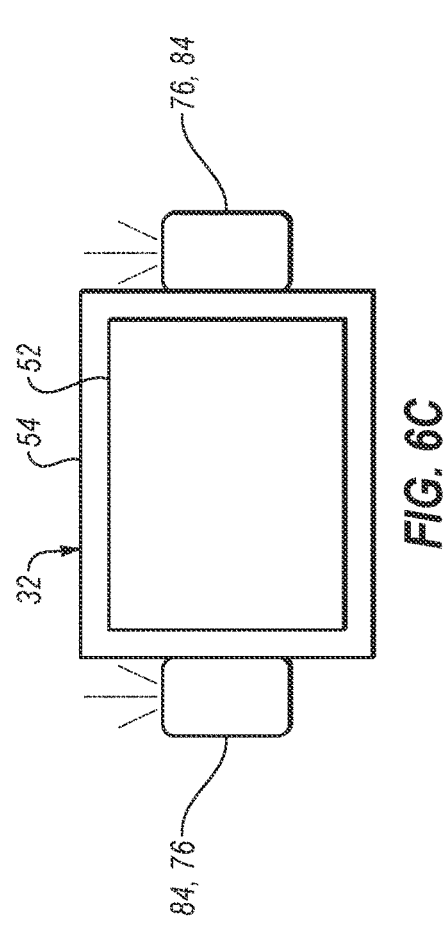
*FIG. 6C*

EJECTING ENERGY MODULE FROM AN AIRCRAFT

BACKGROUND OF THE DISCLOSURE

1. Technical Field

This disclosure relates generally to an aircraft and, more particularly, to preparing an energy source for an emergency.

2. Background Information

Various methods and systems are known in the art for preparing aircraft systems and components for an emergency. While these known preparation systems and methods have various benefits, there is still room in the art for improvement.

SUMMARY OF THE DISCLOSURE

According to an aspect of the present disclosure, an aircraft system is provided that includes an aircraft airframe, a drive unit, a mechanical load, an energy module and an ejection system. The aircraft airframe has an internal compartment. The drive unit is mounted with the aircraft airframe. The mechanical load includes a mechanical load rotor. The drive unit is coupled to and configured to drive rotation of the mechanical load rotor. The energy module is disposed within the internal compartment. The energy module includes an energy source configured to power or fuel operation of the drive unit. The ejection system is configured to eject the energy module out of the internal compartment and away from the aircraft airframe.

According to another aspect of the present disclosure, another aircraft system is provided that includes an aircraft airframe, a drive unit, a mechanical load, a power module and an ejection system. The drive unit is mounted with the aircraft airframe. The mechanical load includes a mechanical load rotor. The drive unit is coupled to and configured to drive rotation of the mechanical load rotor. The power module is arranged with the aircraft airframe. The power module includes a power source configured to power operation of the drive unit. The ejection system is configured to eject the power module away from the aircraft airframe.

According to still another aspect of the present disclosure, another aircraft system is provided that includes an aircraft airframe, a drive unit, a mechanical load, an energy module and an ejection system. The drive unit is mounted with the aircraft airframe. The mechanical load includes a mechanical load rotor. The drive unit is coupled to and configured to drive rotation of the mechanical load rotor. The energy module is arranged with the aircraft airframe. The energy module includes an energy source and a housing. The energy source is configured to power or fuel operation of the drive unit. The housing is configured to contain and seal off the energy source from an external environment during or after ejection of the energy module away from the aircraft airframe. The ejection system is configured to eject the energy module away from the aircraft airframe.

The power module may be coupled to the drive unit by a line. The ejection system may be configured to sever the line prior to or during ejection of the power module away from the aircraft airframe.

The energy source may be fluidly coupled to the drive unit by a fluid line. The ejection system may be configured to sever the fluid line prior to or during ejection of the energy module out of the internal compartment.

The energy source may include a fuel reservoir configured to contain a fluid fuel.

The fluid line may be a fuel line.

The fluid line may be configured to transfer a heat exchange working fluid between the energy source and the drive unit.

The energy source may be electrically coupled to the drive unit by an electric line. The ejection system may be configured to sever the electric line prior to or during ejection of the energy module out of the internal compartment.

The aircraft airframe may include a wall, a cover and an opening through the wall to the internal compartment. The cover may be configured to close the opening. The ejection system may be configured to move the cover and open the opening to facilitate ejection of the energy module out of the internal compartment through the opening.

The aircraft airframe may include a wall adjacent the internal compartment. The ejection system may be configured to form an opening through the wall to facilitate ejection of the energy module out of the internal compartment through the opening.

The ejection system may include a propulsion device configured to propel the energy module: out of the internal compartment; and/or away from the aircraft airframe.

The aircraft system may also include a descent control device arranged with the energy module. The descent control device may be configured to control descent of the energy module following ejection away from the aircraft airframe.

The energy module may also include a housing configured to contain and seal off the energy source from an external environment before, during or after ejection of the energy module out of the internal compartment and away from the aircraft airframe.

The energy module may also include a tracking device which is activated during or after ejection of the energy module out of the internal compartment and away from the aircraft airframe.

The airframe may include a fuselage. The internal compartment may be disposed in the fuselage.

The airframe may include a wing. The internal compartment may be disposed in the wing.

The airframe may include a nacelle for an aircraft propulsion system. The internal compartment may be disposed in the nacelle.

The drive unit may be configured as or otherwise include an internal combustion engine. The internal combustion engine may include a rotating structure coupled to the mechanical load rotor.

The drive unit may include a fluid turbine coupled to the mechanical load rotor.

The drive unit may be configured as or otherwise include an electric motor.

The mechanical load rotor may be configured as or otherwise include a thrust rotor. The mechanical load may be configured to generate aircraft thrust with the thrust rotor.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 6A-C are schematic illustrations of the energy module with various propulsion devices for ejection.

DETAILED DESCRIPTION

Figure 1:
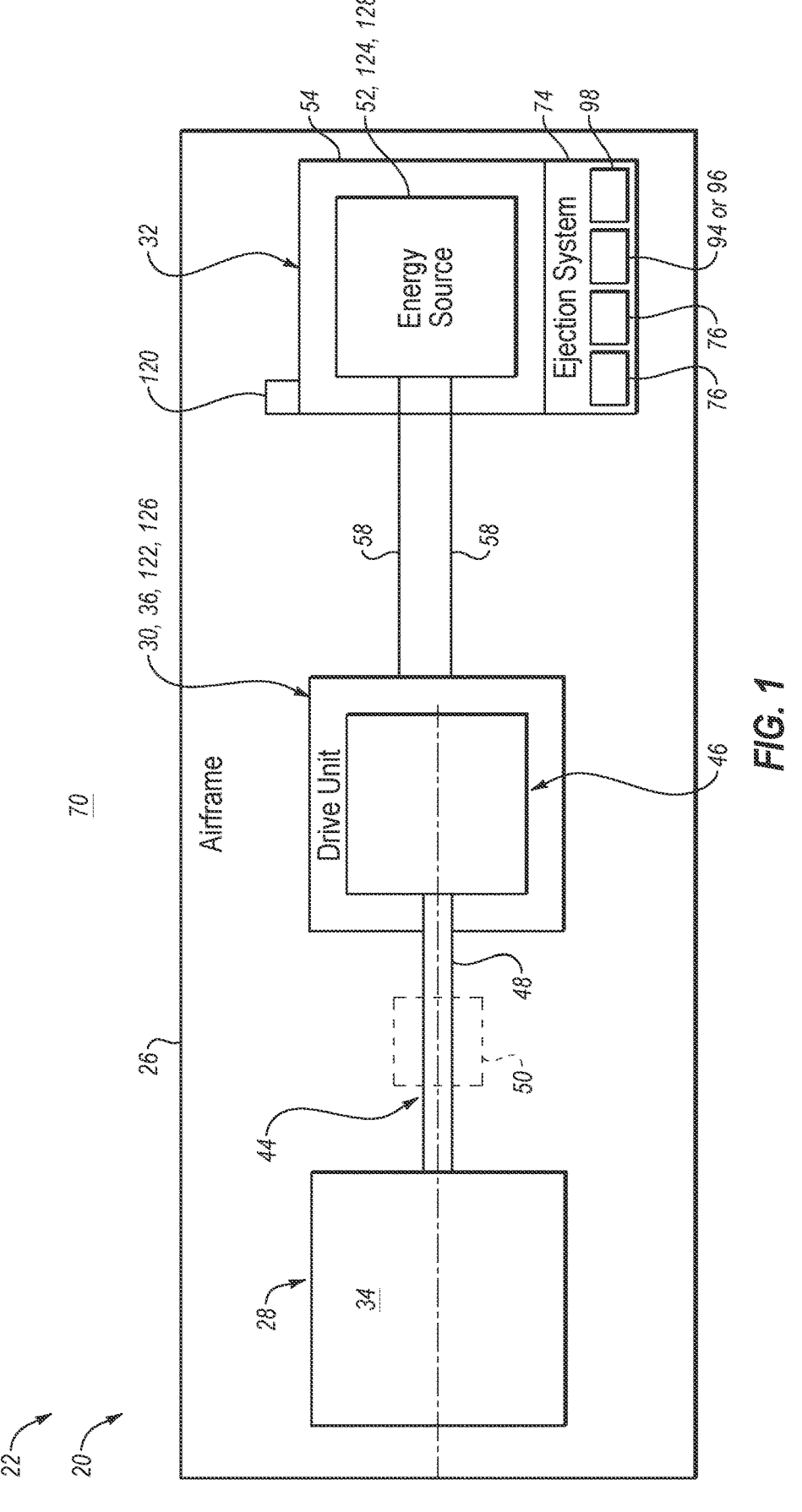
FIG. 1 is a schematic illustration of a system for an aircraft.
Figure 3:
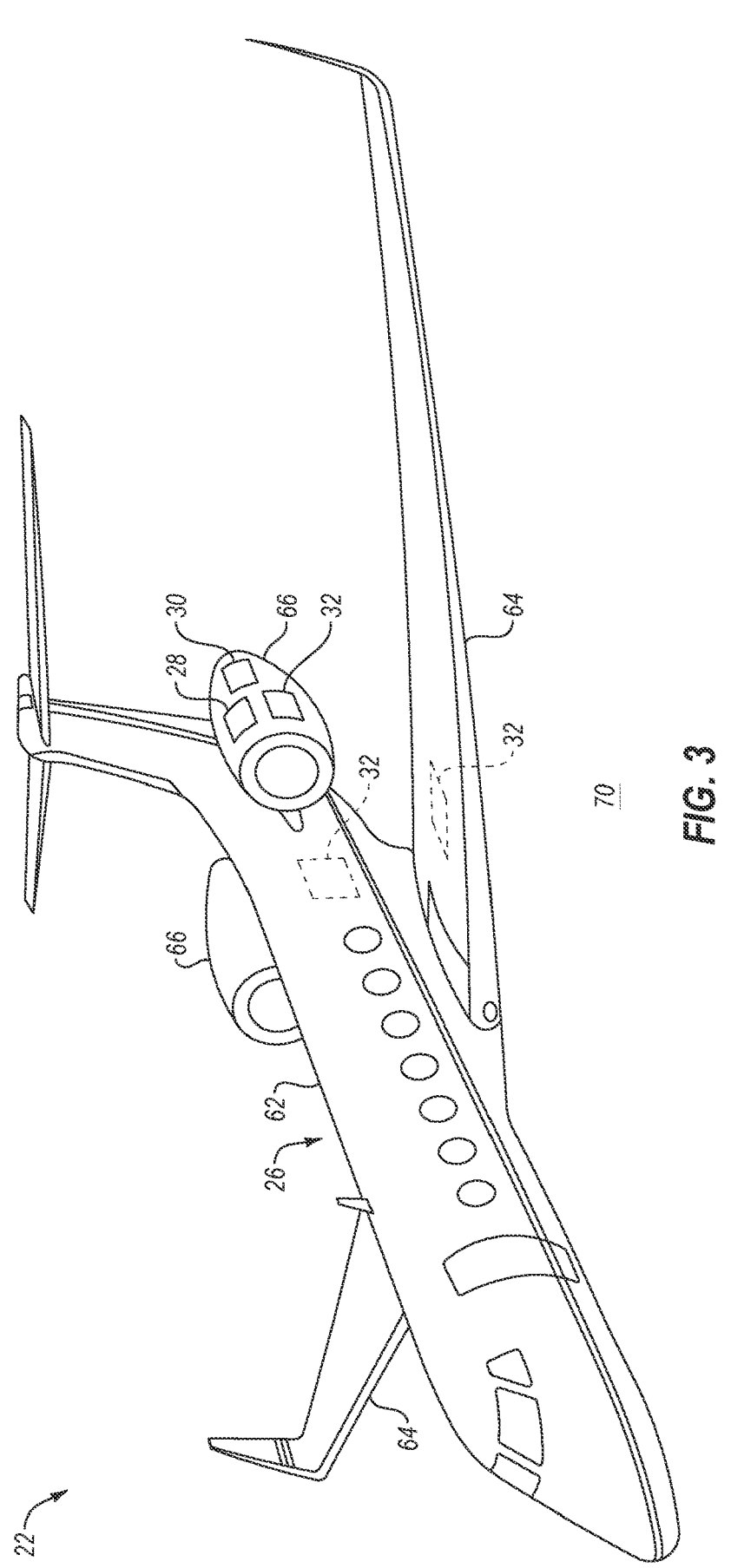
FIG. 3 is an illustration of the aircraft with components of the aircraft system schematically shown.

FIG. 1 illustrates a system 20 for an aircraft 22; see also FIG. 3. The aircraft 22 may be an airplane, a helicopter, a drone (e.g., an unmanned aerial vehicle (UAV)) or any other manned or unmanned aerial vehicle or unmanned aerial system. The aircraft system 20 includes an aircraft power system 24 and an aircraft airframe 26. The power system 24 may be configured as or otherwise include a propulsion system for the aircraft 22. The power system 24 may also or alternatively be configured as or otherwise include an electrical power system for the aircraft 22. The power system 24 of FIG. 1 includes a mechanical load 28, a drive unit 30 and an energy module 32.

The mechanical load 28 of FIG. 1 includes at least one driven rotor 34—a mechanical load rotor. This driven rotor 34 may be configured as a bladed thrust rotor for the aircraft propulsion system. This thrust rotor may be a propulsor rotor for generating propulsive (e.g., forward) thrust. The thrust rotor may also or alternatively be a lift rotor for generating lift thrust. Examples of the thrust rotor include, but are not limited to, a fan rotor for a ducted fan engine (e.g., a turbofan engine), a propeller rotor for a propeller engine (e.g., a turboprop engine), an open rotor for an open rotor engine (e.g., a pusher fan engine, an open tractor rotor engine, etc.), and a rotorcraft rotor (e.g., a main helicopter rotor) for a turboshaft engine. The driven rotor 34 may alternatively be configured as a generator rotor in an electric power generator for the electrical power system. However, for ease of description, the mechanical load 28 may be described below as a thrust section of the aircraft propulsion system and the driven rotor 34 may be described below as the thrust rotor.

Figures 11, 12:
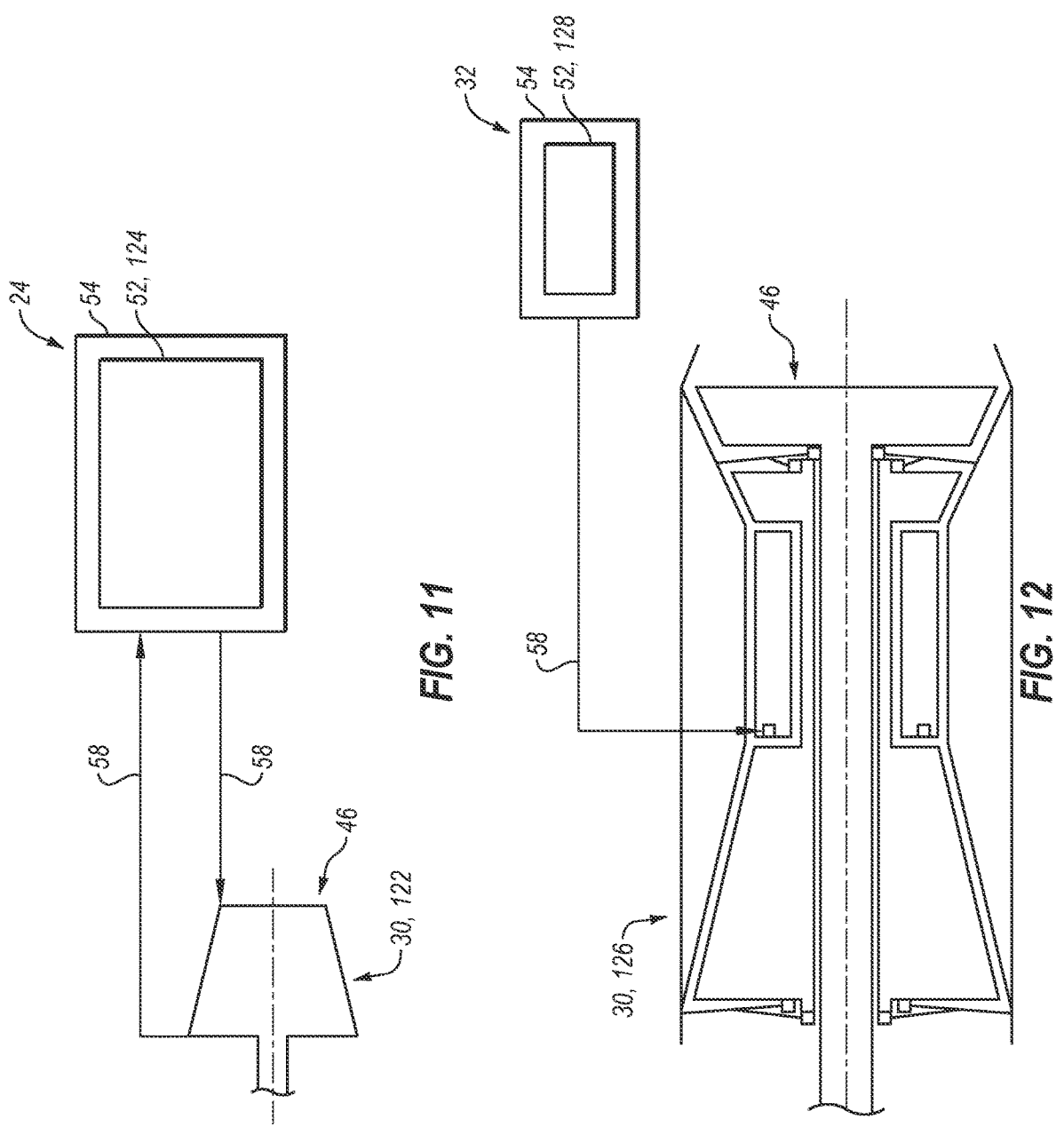
FIG. 11 is a schematic illustration of a fluid turbine coupled to the energy module.
FIG. 12 is a schematic illustration of an engine coupled to the energy module.

The drive unit 30 is configured to drive rotation of the driven rotor 34 and thereby power operation of the mechanical load 28. The drive unit 30 of FIG. 2, for example, is configured as or otherwise includes an electric motor 36. This electric motor 36 is configured to convert electricity received from the energy module 32 into mechanical power. The mechanical power may be utilized for various purposes within the aircraft system 20 of FIG. 1 including driving rotation of the driven rotor 34. The electric motor 36 of FIG. 2 includes an electric motor rotor 38 and an (e.g., annular) electric motor stator 40, where the motor stator 40 may be radially outboard of and circumscribe the motor rotor 38. The electric motor 36 also includes an electric motor case 42 that at least partially or completely houses the motor rotor 38 and the motor stator 40. The drive unit 30 of the present disclosure, however, is not limited to such an exemplary axial flux electric motor nor to electric motor applications. The electric motor 36, for example, may alternatively be configured as a radial flux electric motor. In another example, the drive unit 30 may be configured as or otherwise include an internal combustion engine or a fluid turbine as described below in further detail (e.g., see FIGS. 11 and 12).

Referring to FIG. 1, the drive unit 30 is coupled to the driven rotor 34 through a drivetrain 44. This drivetrain 44 may be configured as a direct drive drivetrain, where a rotating structure 46 of the drive unit 30 (e.g., the motor rotor 38 of FIG. 2) is operable to rotate at a common (the same) rotational speed as the driven rotor 34. The drivetrain 44, for example, may be configured as (or otherwise include) a driveshaft 48 which extends between and is connected to the rotating structure 46 and the driven rotor 34. Alternatively, the drivetrain 44 may be configured as a geared drivetrain where the rotating structure 46 is operable to rotate at a different (e.g., faster, or slower) rotational speed than the driven rotor 34. The drivetrain 44, for example, may include a geartrain 50 (e.g., a transmission, an epicyclic geartrain, a gearbox, etc.) between and coupled to the rotating structure 46 and the driven rotor 34.

Figure 2:
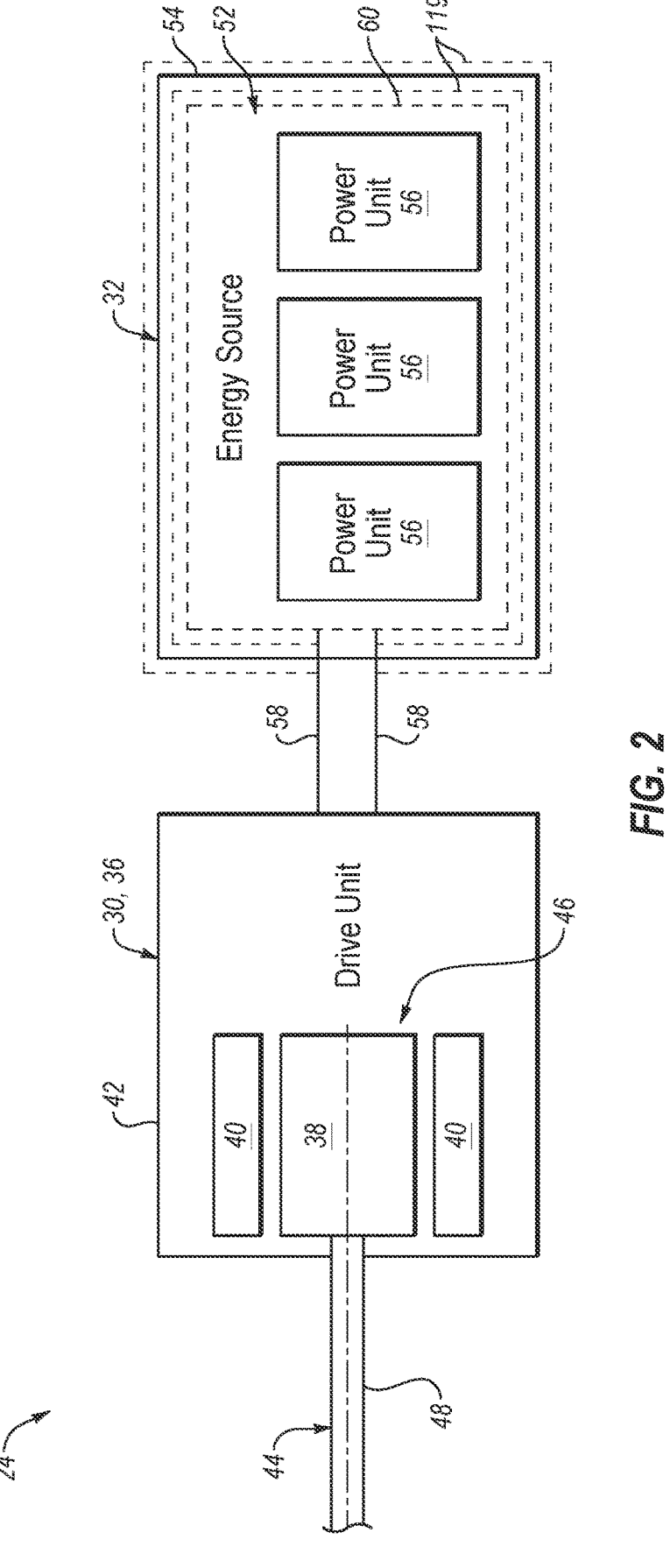
FIG. 2 is a schematic illustration of a drive unit coupled with an energy module.

The energy module 32 of FIG. 1 includes an energy source 52 and an energy module housing 54. Referring to FIG. 2, the energy module 32 and its energy source 52 may be respectively configured as an electric power module and an electric power source. The energy source 52 of FIG. 2, for example, includes one or more electric power units 56 arranged with (e.g., housed within, supported by, etc.) the module housing 54. Each of these electric power units 56 is configured to supply (e.g., output) electric power; e.g., electricity. One or more of the electric power units 56, for example, may each be configured as or otherwise include a battery, a bank of batteries or another type of power storage device(s). In addition or alternatively, one or more of the electric power units 56 may each be configured as or otherwise include a fuel cell or a stack of fuel cells. With such an arrangement, the energy source 52 and its electric power units 56 are electrically coupled to the drive unit 30 through one or more lines 58 (e.g., electric lines), where each line 58 projects out of the module housing 54 to the drive unit 30.

The module housing 54 may be configured as an integral part of the energy source 52 and its one or more electric power units 56. The module housing 54, for example, may be configured as a case containing and supporting internal components of the electric power unit(s) 56. The module housing 54, for example, may be configured as a battery case, a battery bank case, a fuel cell case or a fuel cell stack case. Alternatively, the energy source 52 may include one or more discrete energy source cases (see dashed line 60) for its electric power unit(s) 56, and the module housing 54 may house the energy source 52 and its case(s).

Figures 4A, 4B, 4C:
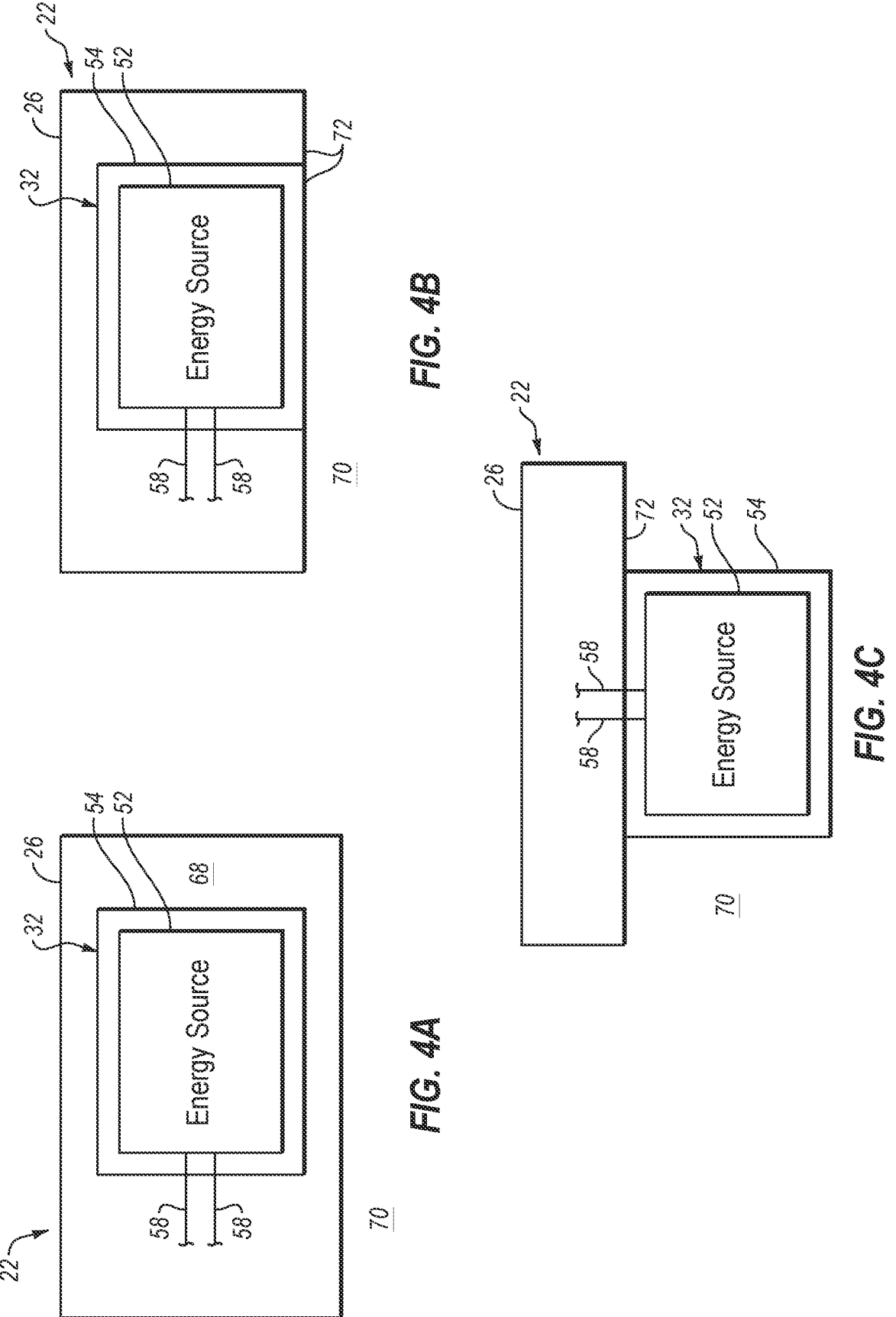
FIGS. 4A-C are schematic illustrations of the energy module and an airframe of the aircraft in various arrangements.

Referring to FIG. 1, the power system 24 and its power system members 28, 30 and 32 are arranged with and mounted to the aircraft airframe 26. For ease of description, the aircraft 22 is illustrated in FIG. 3 as an airplane. However, as discussed above, the present disclosure in not limited to such an exemplary aircraft. The aircraft airframe 26 of FIG. 3 includes an aircraft fuselage 62, one or more aircraft wings 64 and one or more aircraft propulsion system nacelles 66. The mechanical load 28 and the drive unit 30 may be arranged with (e.g., housed within, mounted with, etc.) a respective one of the nacelles 66. The energy module 32 and its members may also be arranged with (e.g., housed within, mounted with, etc.) the respective nacelles 66. Alternatively, the energy module 32 may be remote from the mechanical load 28 and the drive unit 30. The energy module 32, for example, may alternatively be arranged (e.g., housed within, mounted to, etc.) a respective one of the wings 64 or the fuselage 62. At any of these locations, the energy module 32 may be configured within/internal to the aircraft airframe 26. The energy module 32 of FIG. 4A, for example, is disposed within an internal compartment 68 of the aircraft airframe 26 such that the energy module 32 and its energy source 52 are not exposed to an environment 70 external to the aircraft 22 and its aircraft airframe 26 during normal aircraft operation. However, referring to FIG. 4B, it is contemplated the module housing 54 may alternatively be configured to form an exterior portion of the aircraft airframe 26 (e.g., recessed into and partially form an exterior skin 72 of the aircraft airframe 26). Referring to FIG. 4C, it is also contemplated the module housing 54 may be external to the aircraft airframe 26.

During an emergency situation and under certain conditions, the aircraft 22 may land or conduct an emergency landing at a location other than an airport (or may conduct an emergency landing at the airport). A pilot or pilots, for example, may conduct the emergency landing of the aircraft 22 in an open field or on a body of water. Alternatively, the pilot(s) may abandon the aircraft 22, such as in an ejection. For example, in the case of a manned aircraft, the pilot(s) may eject from the aircraft 22. In the case of an unmanned aircraft, the pilot may guide the aircraft 22 as long as possible until contacting the ground. In any one of these situations, the aircraft 22 may be subject to relatively strong forces and stresses which can dislodge, break and/or otherwise damage various components of the aircraft 22. To reduce or prevent unwanted environmental exposure to the energy source 52 and its internal components, fluids, etc. during an emergency landing or crash, the aircraft system 20 of FIG. 1 is configured with an ejection system 74. This ejection system 74 is configured to eject the energy module 32 and its energy source 52 from the aircraft 22 and its aircraft airframe 26 prior to the emergency landing. Thus, the energy module 32 and its energy source 52 may not be subject to the same forces and/or stresses as the rest of the aircraft 22 and its airframe 26. Moreover, by separating the energy module 32 from the rest of the aircraft 22, the energy module 32 and its energy source 52 may be protected from potential dangerous situations, such as fire.

The ejection system 74 of FIG. 1 includes one or more propulsion devices 76. These propulsion devices 76 are configured to propel the energy module 32 out of the internal compartment 68 (when applicable) and away from the aircraft airframe 26; e.g., see FIGS. 5A and 5B. Each propulsion device 76 of FIG. 6A, for example, is configured as a spring element 78; e.g., a coil spring, a leaf spring, etc. Prior to ejection, the spring element 78 is compressed between the energy module 32 and its module housing 54 and a fixed structure 80 of the aircraft airframe 26. For ejection, the ejection system 74 (see FIG. 1) releases the compressed spring element 78 (or a retainer holding the energy module 32), and the spring element 78 propels the energy module 32 away from the fixed structure 80. In another example, each propulsion device 76 of FIG. 6B is configured as a rocket 82. For ejection, the ejection system 74 (see FIG. 1) lights the rocket 82, and the lit rocket 82 propels the energy module 32 away from the aircraft airframe 26 (see FIG. 1). In still another example, each propulsion device 76 of FIG. 6C is configured as a miniature jet engine 84. For ejection, the ejection system 74 (see FIG. 1) turns on (e.g., powers, lights, etc.) the jet engine 84 and the jet engine 84 propels the energy module 32 away from the aircraft airframe 26 (see FIG. 1). The present disclosure, however, is not limited to the foregoing exemplary propulsion device types or configurations.

Figure 7:
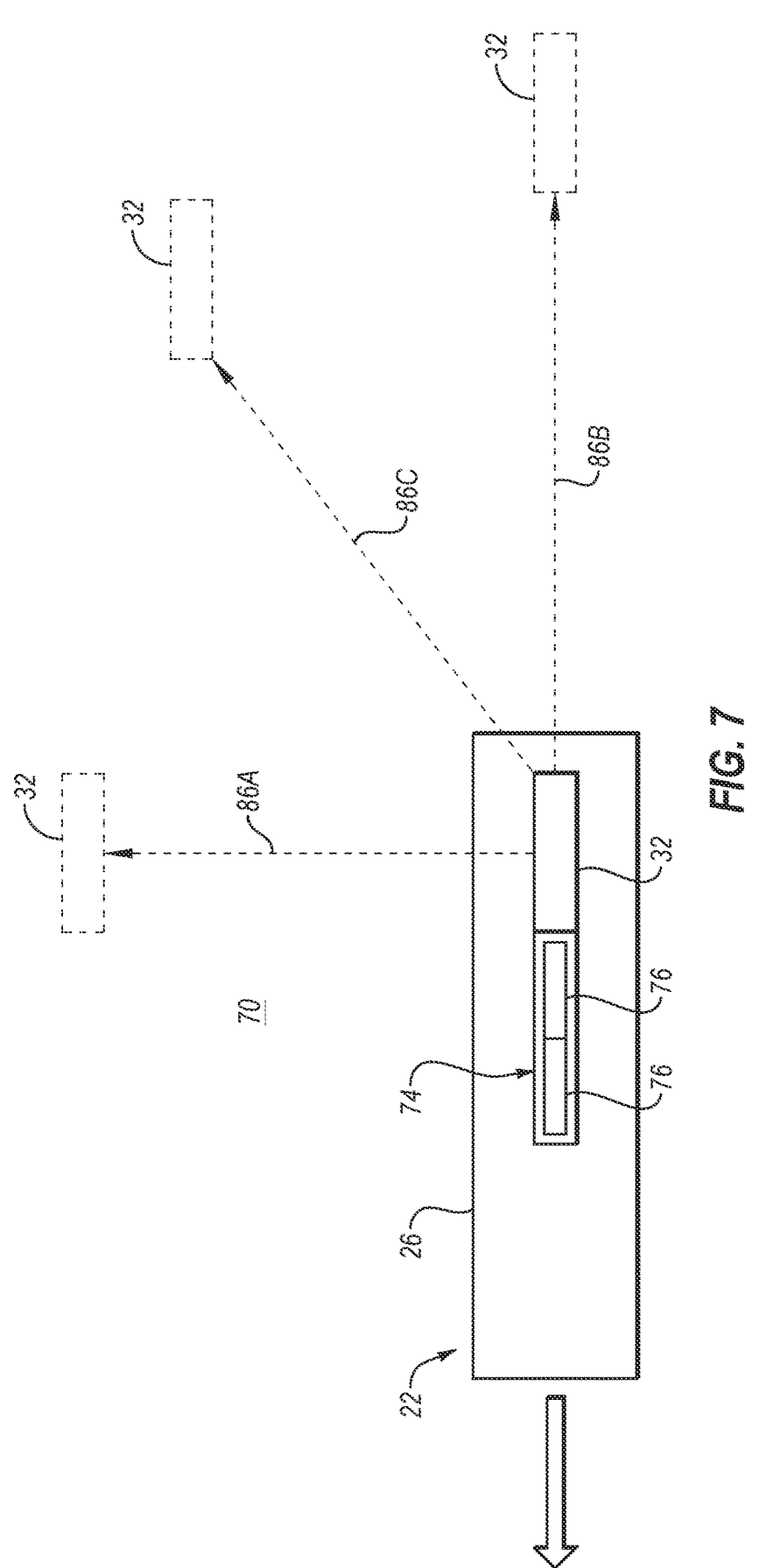
FIG. 7 is a schematic illustration of the aircraft with various trajectories for ejecting the energy module.

Referring to FIG. 7, the ejection system 74 and its propulsion devices 76 may be configured to eject and propel the energy module 32 in various directions away from the aircraft 22 and its aircraft airframe 26. The energy module 32, for example, may be ejected/propelled in an upward direction 86A away from the aircraft 22 and its aircraft airframe 26. Alternatively, the energy module 32 may be ejected/propelled in a lateral direction 86B away from the aircraft 22 and its aircraft airframe 26. Still alternatively, the energy module 32 may be ejected/propelled in an upward-lateral direction 86C away from the aircraft 22 and its aircraft airframe 26. The lateral direction (or lateral component) may be to a side of the aircraft 22 and its aircraft airframe 26 and/or to a rear of the aircraft 22 and its aircraft airframe 26. In general, however, the lateral direction (or component) does not extend towards a front of the aircraft 22 and its aircraft airframe 26 such that the energy module 32 does not become an obstacle to the still flying aircraft 22. Also in general, the energy module 32 is not ejected in a downward direction as this may propel the energy module 32 towards the ground at a higher velocity.

Figure 5B:
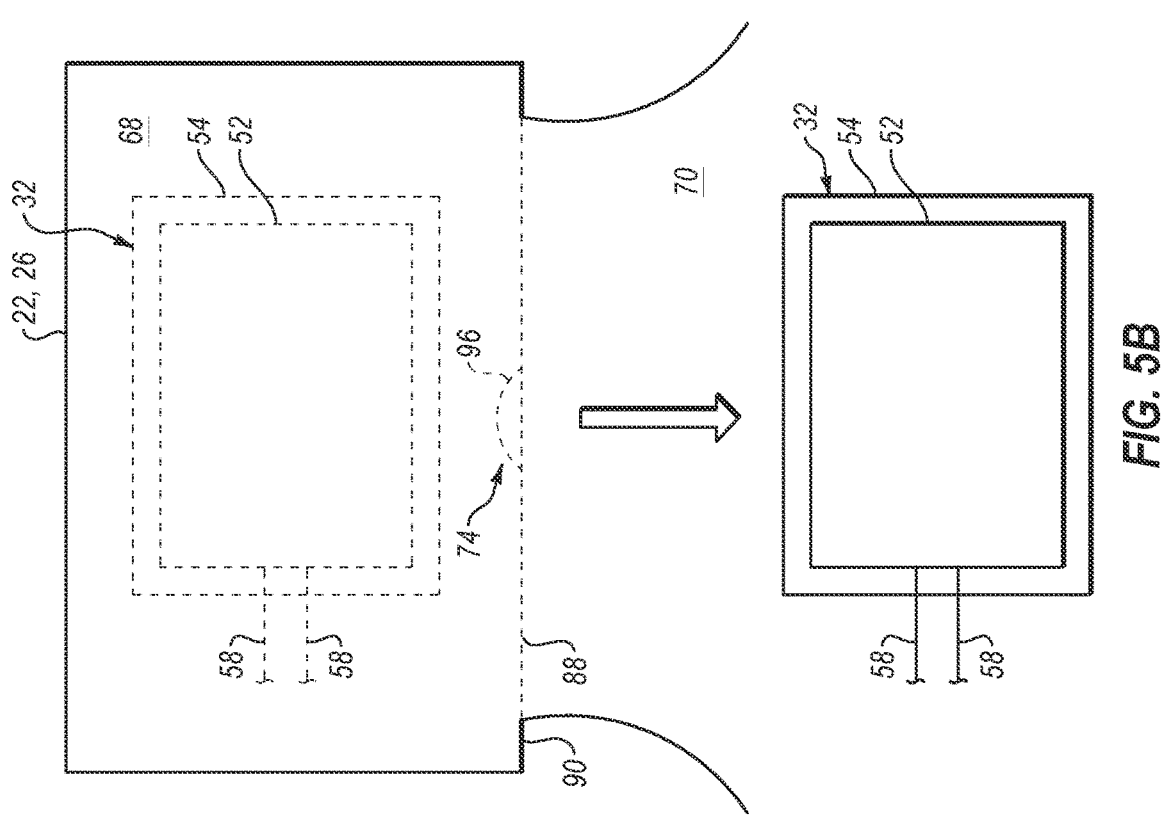
FIGS. 5A and 5B are schematic illustrations of various techniques for providing an opening through an airframe wall during ejection of the energy module.
Figure 5A:
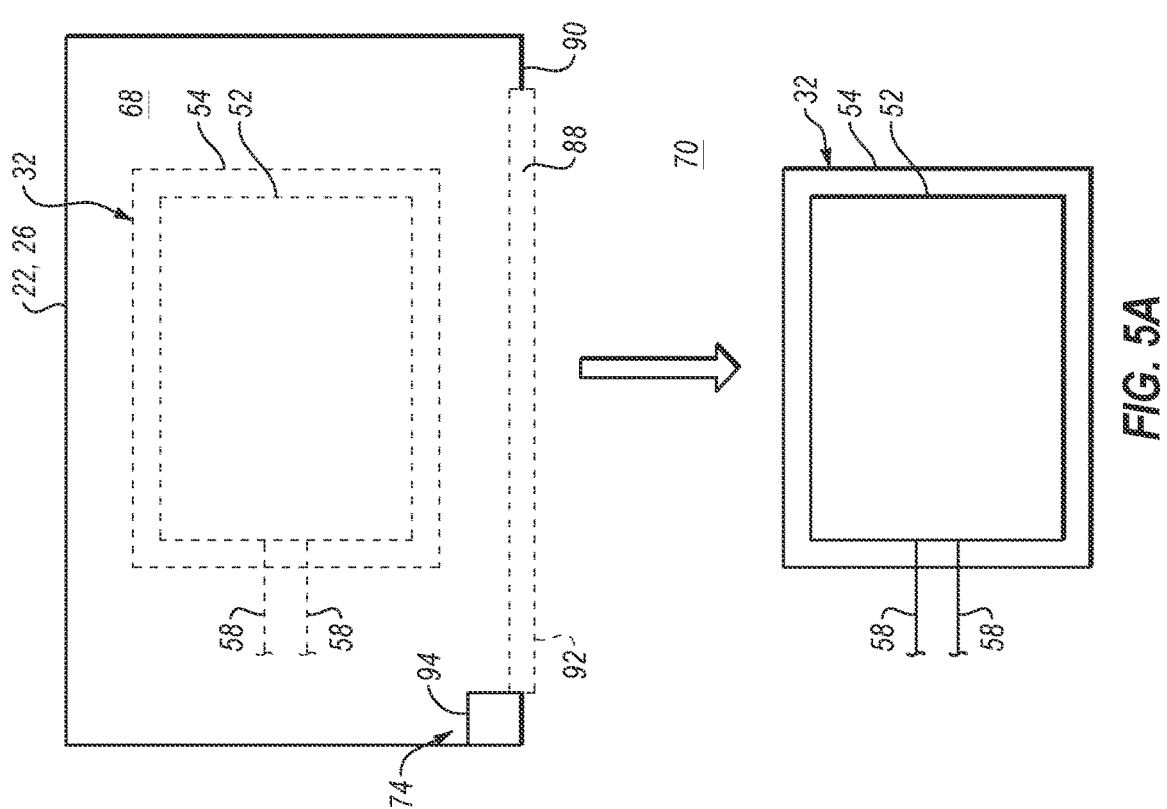

Referring to FIGS. 5A and 5B, when the energy module 32 is disposed within the internal compartment 68, the ejection system 74 may also be configured to provide an opening 88 through a wall 90 of the aircraft airframe 26. The energy module 32 may thereby be propelled through the opening 88 into the external environment 70 for ejection. The ejection system 74 of FIG. 5A, for example, is configured to trigger movement of a cover 92 for the opening 88. During normal aircraft operation, the cover 92 closes the opening 88 in the airframe wall 90. However, during an emergency, the ejection system 74 may trigger a cover actuator 94 to move the cover 92 to uncover the opening 88. The cover 92, for example, may be a door that can translate (e.g., slide) or pivot open. In another example, the cover 92 may be a panel latched to the wall 90 via one or more latches. Here, the actuator 94 may release the latches to facilitate separation of the cover 92 from the wall 90 and open the opening 88. Alternatively, the cover 92 may be a panel which can be separated (e.g., ejected) from the aircraft airframe 26. In another example, the ejection system 74 of FIG. 5B is configured as a controlled explosive charge 96. During an emergency, the ejection system 74 may trigger detonation of the explosive charge 96, and the detonated explosive charge 96 may explosively form the opening 88 in the airframe wall 90.

Figures 8A, 8B:
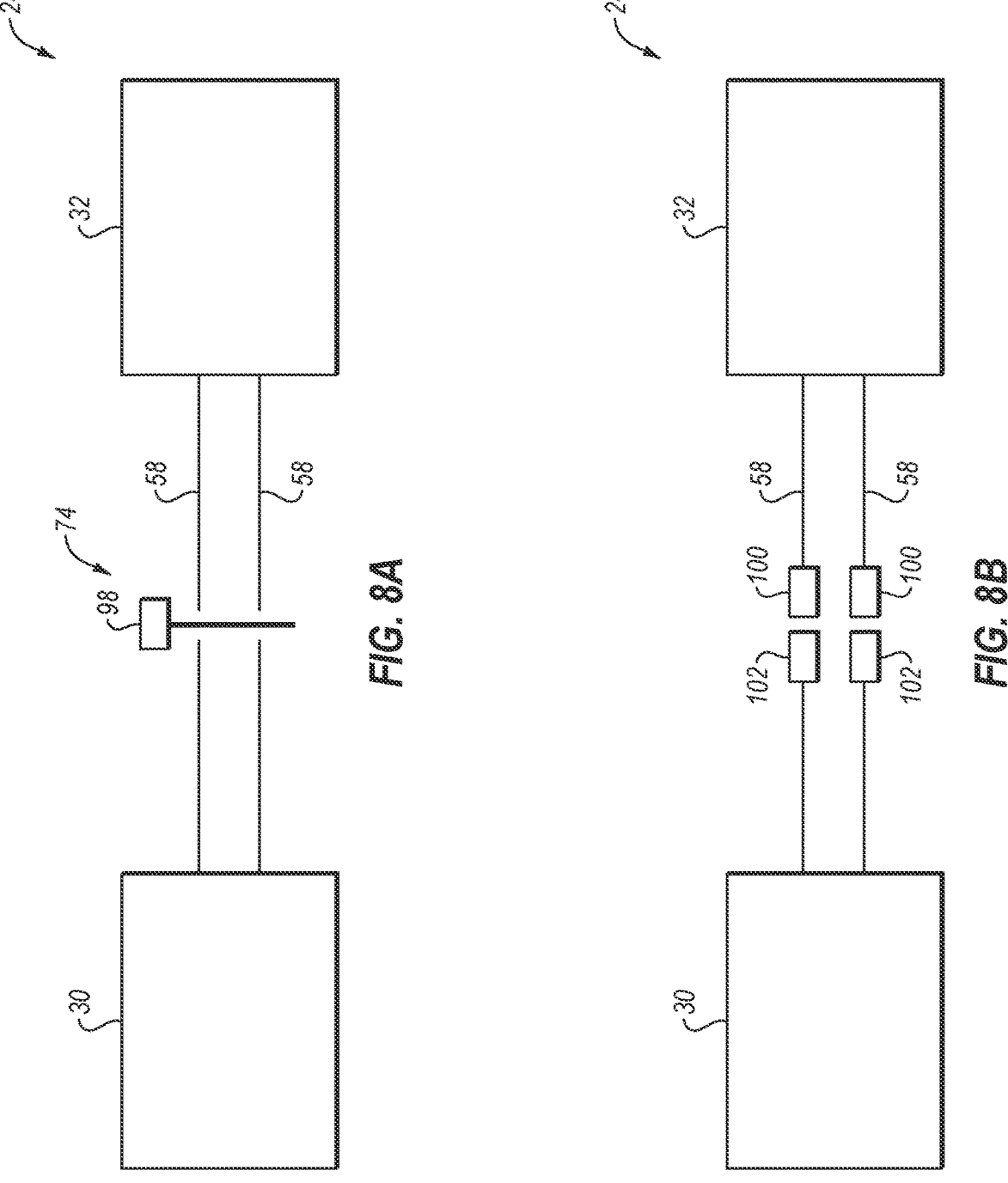
FIGS. 8A and 8B are schematic illustrations of various techniques for decoupling the energy module from the drive unit.

Referring to FIGS. 8A and 8B, just prior to or during the ejection of the energy module 32 from the aircraft airframe 26 (see FIG. 1), the lines 58 coupling the energy source 52 to the drive unit 30 may be severed. Referring to FIG. 8A, this severing of the lines 58 may be a destructive severing. For example, the ejection system 74 (or another device or system) may include a cutting device 98 (e.g., a shear) configured to cut each line 58. In another example, each line 58 may be configured to snap apart or pull out from the energy source 52 and/or the drive unit 30. Alternatively, referring to FIG. 8B, the severing of the lines 58 may be a non-destructive severing. Each line 58 of FIG. 8B, for example, includes at least one plug 100 which may be dislodged from a receptacle 102 when pulled by more than a certain (e.g., threshold) force; e.g., a force less than a force of ejection.

Figure 9B:
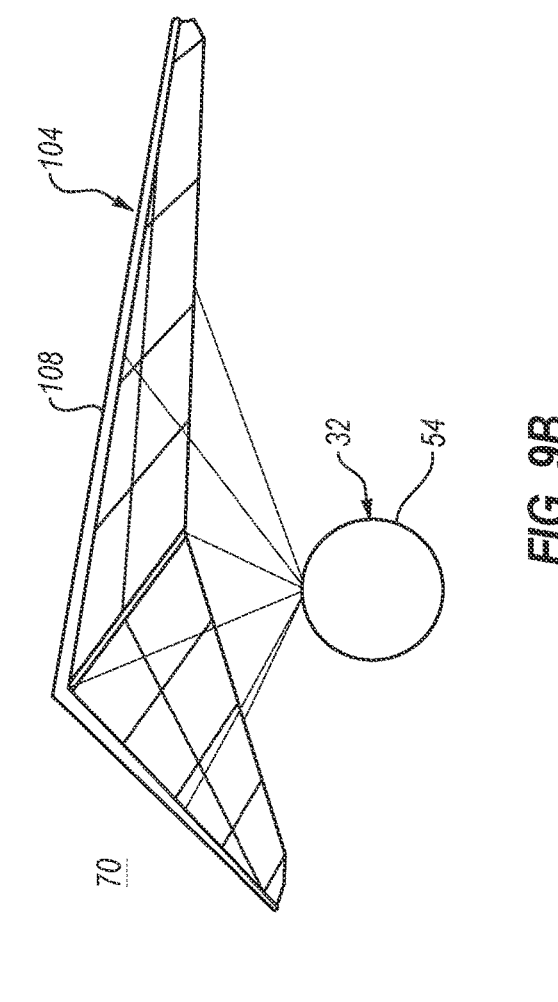
FIGS. 9A-C are illustrations of various descent control devices for the energy module deployed following ejection.
Figure 9C:
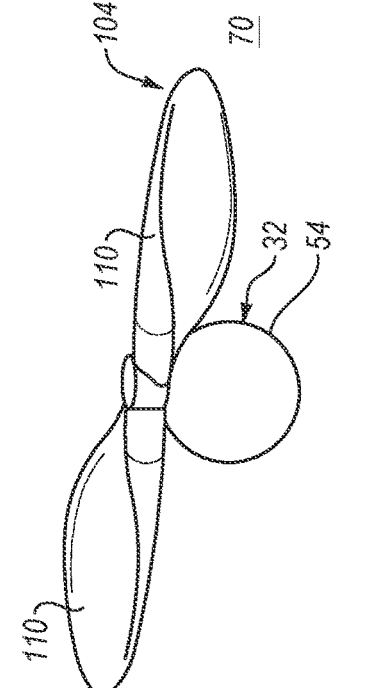
Figure 9A:
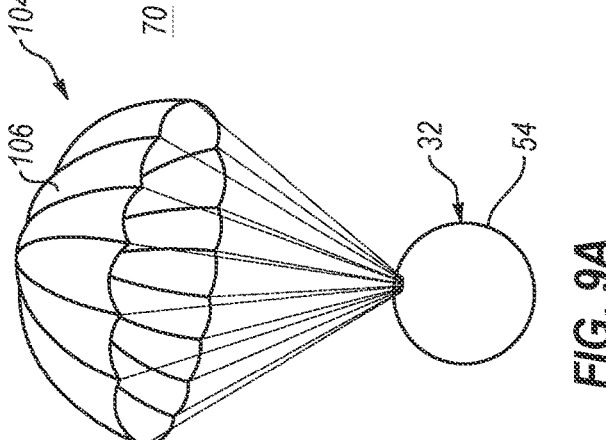

Referring to FIGS. 9A-C, the energy module 32 (and/or the wall 90) may be configured with a descent control device 104. This descent control device 104 is configured to deploy following ejection of the energy module 32 away from the aircraft 22 and its aircraft airframe 26 (see FIG. 7). Upon deployment, the descent control device 104 is configured to control (e.g., slow) descent of the energy module 32 down through the external environment 70. For example, referring to FIG. 9A, the descent control device 104 may be configured as or otherwise include a parachute 106 attached to the energy module 32 and its module housing 54. In another example, referring to FIG. 9B, the descent control device 104 may be configured as or otherwise include a glider 108 attached to the energy module 32 and its module housing 54. In still another example, referring to FIG. 9C, the descent control device 104 may include a plurality of (e.g., helicopter) wings 110 attached to the energy module 32 and its module housing 54. Here, the wings 110 may function similar to wings on a tree seed pod; e.g., a helicopter seed.

Figure 10B:
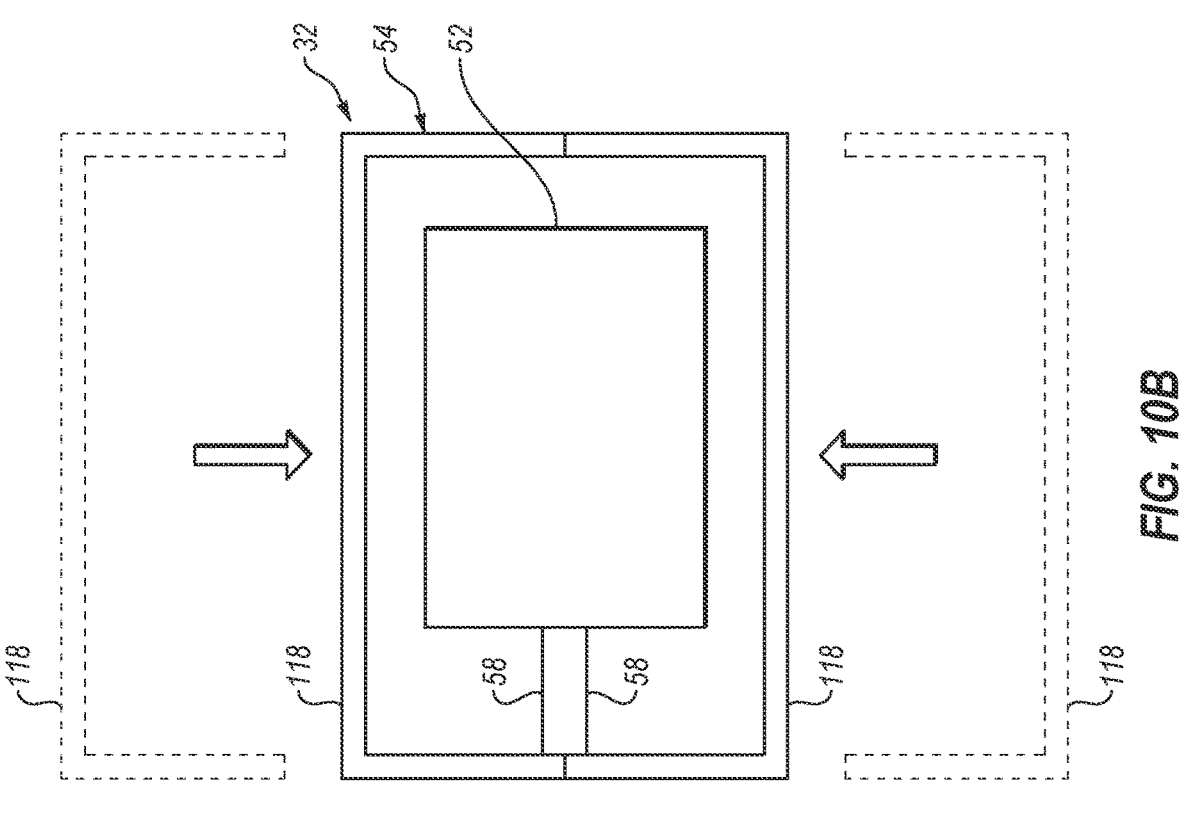
FIGS. 10A and 10B are schematic illustrations of various techniques for enclosing and sealing off an energy source from an exterior environment.
Figure 10A:
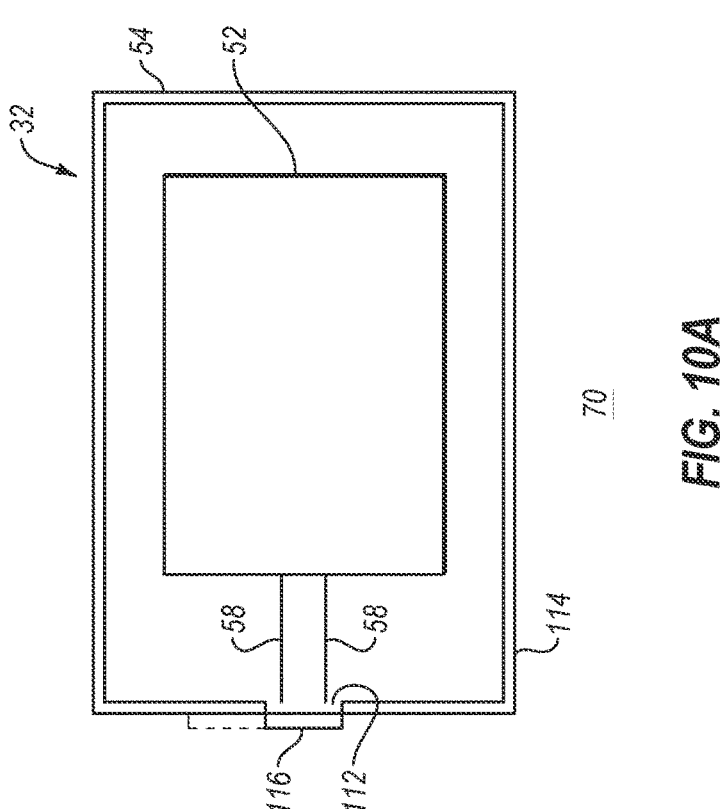

Referring to FIGS. 10A and 10B, just prior to, during or following the ejection of the energy module 32 from the aircraft airframe 26 (see FIG. 7), the module housing 54 may be configured to close up and contain and seal off the energy source 52 from the external environment 70. For example, referring to FIG. 10A, an opening 112 through a sidewall 114 of the module housing 54 for the line(s) 58 may be covered by an actuatable door 116. Note, in some embodiments, this door 116 may also be configured as the shear for severing the respective line(s) 58. In another example, referring to FIG. 10B, the module housing 54 may include multiple segments 118 (e.g., housing halves) which come together to enclose the energy source 52. In some embodiments, the mating of the segments 118 may shear and thereby sever the respective line(s) 58. By containing and sealing off the energy source 52 from the external environment 70 within the module housing 54, the module housing 54 may reduce or prevent exposure of the energy source 52 to the external environment 70 while falling to the ground as well as following a (e.g., controlled) impact with the ground.

In some embodiments, referring to FIG. 2, an interior of the module housing 54 may be lined with an impact absorption material 119. This impact absorption material 119 may be configured to absorb kinetic energy upon impact with the ground. Examples of the impact absorption material 119 include, but are not limited to, rubber, foam, corrugated metal or any other resilient, cellular and/or crushable material. In addition, while the impact absorption material 119 may be disposed within the module housing 54 around the energy source 52, the impact absorption material 119 may also or alternatively line an exterior of the module housing 54.

In some embodiments, referring to FIG. 1, the energy module 32 may be configured with a tracking device 120; e.g., a global positioning system (GPS) tracker. This tracking device 120 may be activated just prior to, during or following the ejection of the energy module 32 from the aircraft airframe 26. Thus, personnel may be deployed to a location of the energy module 32 following ejection to quickly retrieve the energy module 32. The energy module 32 may also be provided with various labels to warn unauthorized personnel from tampering with the energy module 32.

While the drive unit 30 is described above as the electric motor 36 and the energy source 52 is described as the electric power source, the present disclosure is not limited to such an exemplary embodiment. For example, referring to FIG. 11, the drive unit 30 may alternatively be configured as a fluid turbine 122. Here, the energy source 52 may be configured as a fluid power source 124 that provides pressurized and/or heated working fluid (e.g., heat exchange fluid) to the fluid turbine 122 for expansion. The expansion of the working fluid in turn drives the rotation of the driven rotor 34 (see FIG. 1). The fluid power source 124 may be configured as part of a Rankin cycle system or may include a solid state heat source which heats the working fluid through a heat exchanger. Here, each line 58 is configured as a fluid line for flowing the working fluid. In another example, referring to FIG. 12, the drive unit 30 may still alternatively be configured as an internal combustion engine 126. This engine 126 may be configured as a gas turbine engine, a rotary engine, a reciprocating piston engine or any other similar thermal engine. Here, the energy source 52 may be configured as a fuel source 128 that provides fuel to the engine 126 for combustion. This fuel may be a non-hydrocarbon fuel/a hydrocarbon free fuel such as, but not limited to, hydrogen ($H_2$) fuel (e.g., $H_2$ gas) or ammonia ($NH_3$) fuel. Alternatively, the fuel may be a hydrocarbon fuel such as, but not limited to, kerosene, jet fuel or sustainable aviation fuel (SAF). The fuel source 128 may be configured as or otherwise include a fuel reservoir which contains the fuel provided to the engine 126. Here, each line 58 is configured as a fuel line for flowing the fuel.

Where one or more of the lines 58 is/are fluid lines, the ejection system 74 may direct (e.g., pump) some or all of the fluid (e.g., other than fuel) out of the lines 58 and into the energy module 32. The fluid may be stored within the energy module 32 and its module housing 54 for ejection from the aircraft 22. Here, the energy module 32 and its module housing 54 may prevent outside exposure to the fluid following impact with the ground.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
an aircraft airframe with an internal compartment;
a drive unit mounted with the aircraft airframe;
a mechanical load comprising a mechanical load rotor, the drive unit coupled to and configured to drive rotation of the mechanical load rotor;
an energy module disposed within the internal compartment, the energy module comprising an energy source configured to power or fuel operation of the drive unit, and the energy source fluidly coupled to the drive unit by a fluid line extending between the drive unit and the energy source; and an ejection system configured to eject the energy module out of the internal compartment and away from the aircraft airframe, and the ejection system configured to shear the fluid line prior to or during ejection of the energy module out of the internal compartment;

wherein the energy source is directly coupled to the drive unit.

2. The aircraft system of claim 1, wherein the energy source comprises a fuel reservoir configured to contain a fluid fuel; and the fluid line comprises a fuel line.

3. The aircraft system of claim 1, wherein the energy source comprises a fluid power source configured to contain a heat exchange working fluid; and the fluid line is configured to transfer the heat exchange working fluid between the energy source and the drive unit.

4. The aircraft system of claim 1, wherein the energy source is electrically coupled to the drive unit by an electric line; and the ejection system is configured to sever the electric line prior to or during ejection of the energy module out of the internal compartment.

5. The aircraft system of claim 1, wherein the aircraft airframe includes a wall, a cover and an opening through the wall to the internal compartment, and the cover is configured to close the opening; and the ejection system is configured to move the cover and open the opening to facilitate ejection of the energy module out of the internal compartment through the opening.

6. The aircraft system of claim 1, wherein the aircraft airframe includes a wall adjacent the internal compartment; and the ejection system is configured to form an opening through the wall to facilitate ejection of the energy module out of the internal compartment through the opening.

7. The aircraft system of claim 1, wherein the ejection system comprises a propulsion device configured to propel the energy module at least one of out of the internal compartment; or away from the aircraft airframe.

8. The aircraft system of claim 1, further comprising:

a descent control device arranged with the energy module;

the descent control device configured to control descent of the energy module following ejection away from the aircraft airframe.

9. The aircraft system of claim 1, wherein the energy module further comprises a housing configured to contain and seal off the energy source from an external environment before, during or after ejection of the energy module out of the internal compartment and away from the aircraft airframe.

10. The aircraft system of claim 1, wherein the energy module further comprises a tracking device which is activated during or after ejection of the energy module out of the internal compartment and away from the aircraft airframe.

11. The aircraft system of claim 1, wherein the aircraft airframe comprises a fuselage; and the internal compartment is disposed in the fuselage.

12. The aircraft system of claim 1, wherein the aircraft airframe comprises a nacelle for an aircraft propulsion system; and the internal compartment is disposed in the nacelle.

13. The aircraft system of claim 1, wherein the drive unit comprises an internal combustion engine; and the internal combustion engine comprises a rotating structure coupled to the mechanical load rotor.

14. The aircraft system of claim 1, wherein the drive unit comprises a fluid turbine coupled to the mechanical load rotor.

15. The aircraft system of claim 1, wherein the drive unit comprises an electric motor.

16. The aircraft system of claim 1, wherein the mechanical load rotor comprises a thrust rotor; and the mechanical load is configured to generate aircraft thrust with the thrust rotor.

17. An aircraft system, comprising:

an aircraft airframe;

a drive unit mounted with the aircraft airframe;

a mechanical load comprising a mechanical load rotor, the drive unit coupled to and configured to drive rotation of the mechanical load rotor;

a power module arranged with the aircraft airframe, the power module comprising a power source configured to power operation of the drive unit, and the power module coupled to the drive unit by a line projecting out of the power module and to the drive unit; and an ejection system configured to eject the power module away from the aircraft airframe, the ejection system configured to destructively sever the line prior to or during ejection of the power module away from the aircraft airframe.

18. An aircraft system, comprising:

an aircraft airframe;

a drive unit mounted with the aircraft airframe;

a mechanical load comprising a mechanical load rotor, the drive unit coupled to and configured to drive rotation of the mechanical load rotor;

an energy module arranged with the aircraft airframe, the energy module including an energy source and a housing, the energy source configured to power or fuel operation of the drive unit, the housing configured to contain and seal off the energy source from an external environment during or after ejection of the energy module away from the aircraft airframe, the energy source fluidly coupled to the drive unit by a fluid line projecting out of the housing to the drive unit; and an ejection system configured to destructively sever the fluid line and eject the energy module away from the aircraft airframe;

wherein the energy module further comprises a tracking device which is activated during or after ejection of the energy module away from the aircraft airframe.

* * * * *